(12) United States Patent
Bedeski et al.

(10) Patent No.: US 6,516,055 B1
(45) Date of Patent: Feb. 4, 2003

(54) INTERFACE FOR TROUBLE REPORT INPUT SYSTEM AND TROUBLE REPORT RESOLUTION SYSTEM

(75) Inventors: Robert J. Bedeski, Lilburn, GA (US); H. R. Greene, Jr., Seymour, TN (US); Corky Umstead, Tucker, GA (US); Debbie A. Hill, Canton, GA (US); Ron D. Stanley, Stockbridge, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 0 days.

(21) Appl. No.: 09/474,369

(22) Filed: Dec. 29, 1999

(51) Int. Cl.[7] .......................... H04M 1/24; G06F 11/00
(52) U.S. Cl. ............... 379/32.01; 379/1.01; 379/9.03; 379/29.01; 714/48; 714/100
(58) Field of Search ................ 379/1.01, 29.01, 379/29.09, 32.01, 33; 714/100, 1, 2, 3, 25, 27, 28, 48, 57; 279/2, 9, 9.03, 22

(56) References Cited

U.S. PATENT DOCUMENTS

| 4,972,453 A | * | 11/1990 | Daniel, III et al. | ............ 379/10 |
| 5,666,481 A | * | 9/1997 | Lewis | ............................ 714/4 |
| 5,692,030 A | * | 11/1997 | Telglovic et al. | ............. 379/14 |
| 5,881,131 A | * | 3/1999 | Farris et al. | .................. 379/27 |
| 5,937,048 A | * | 8/1999 | Pelle | .......................... 379/201 |
| 6,032,184 A | * | 2/2000 | Cogger et al. | .............. 709/223 |
| 6,057,757 A | * | 5/2000 | Arrowsmith et al. | ....... 340/506 |
| 6,219,648 B1 | * | 4/2001 | Jones et al. | ..................... 705/8 |

* cited by examiner

*Primary Examiner*—Curtis Kuntz
*Assistant Examiner*—Quoc D. Tran
(74) *Attorney, Agent, or Firm*—Shaw Pittman LLP

(57) ABSTRACT

A trouble report processing system provides an electronic interface between a telephone company's trouble report input system and its trouble report resolution system. The interface eliminates the need for the trouble report input system to generate a paper ticket that must be carried to a trouble report resolution system. An operator receives a call and generates a trouble report which is stored in the trouble report input system as an electronic trouble ticket. The interface continually, periodically or as desired, monitors the trouble report input system for the presence of new electronic trouble tickets. When the interface finds a new electronic trouble ticket, it acquires the information contained therein and uses it to build a trouble ticket in a format that the trouble ticket resolution system can process. The trouble ticket resolution system provides the trouble information to a technician who either fixes the problem reported by the subscriber or determines that it must be referred to another department for resolution. The resolution of the ticket, whether fixed or referred, is forwarded by the trouble report resolution system to the trouble report input system, where the resolution of the ticket is stored. The trouble ticket is then closed out.

17 Claims, 14 Drawing Sheets

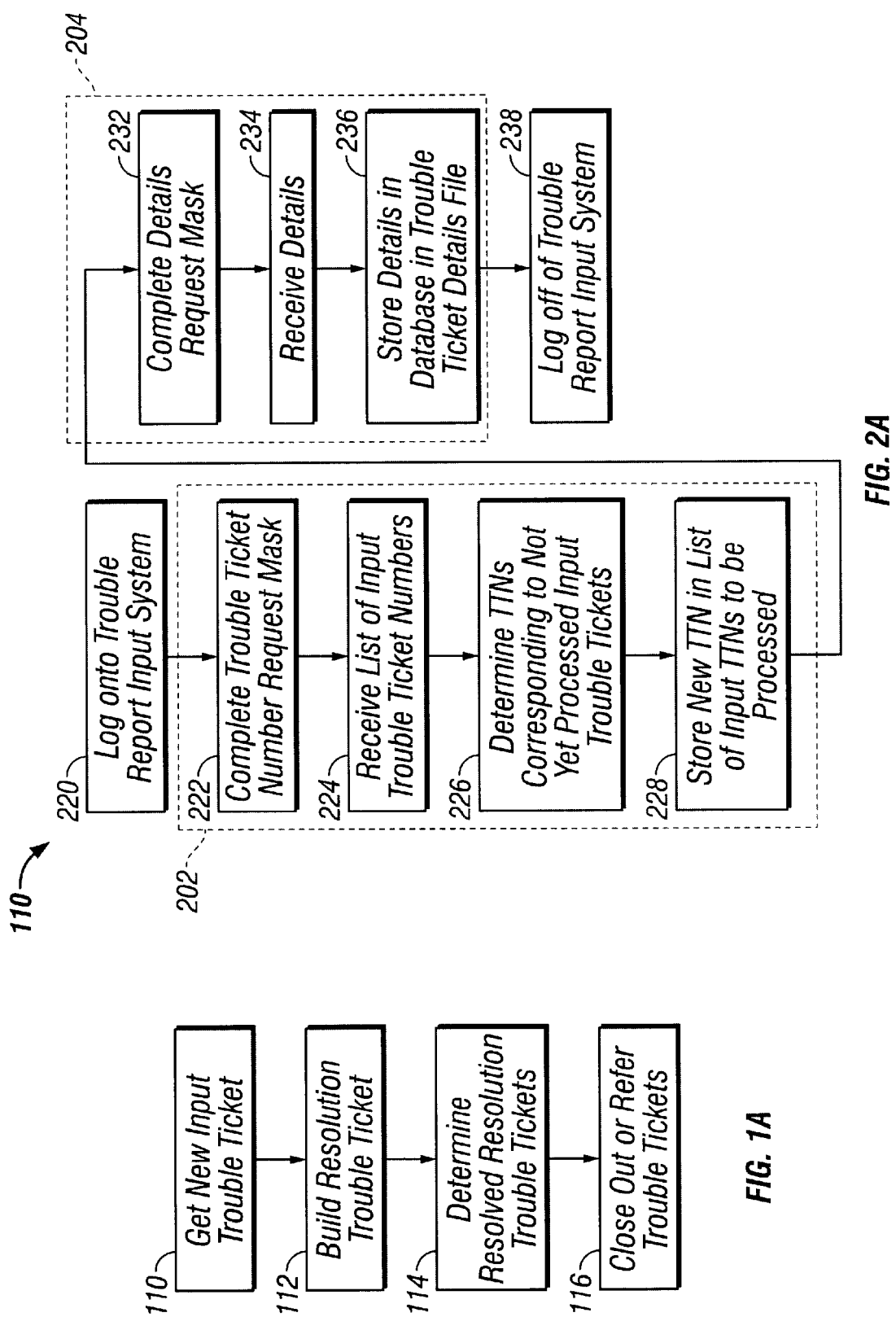

```
200
┌─────────────────────────────────────────────────────────────┐
│                                                             │
│   MCMD    MC    DAA    SUPV GRP    EMP CODE    PRTR   REQ BY│
│   PAGE    ARG                                               │
│                                                             │
└─────────────────────────────────────────────────────────────┘
```

*FIG. 2B*

```
250
┌─────────────────────────────────────────────────────────────┐
│                                              120-06-99 0824A│
│   MSCR    MC    SCREENER EC                                 │
│   TN TTN                     SELECT STATUS     RTE          │
│                                                             │
│                                                             │
│                                                             │
│                                                             │
│   TEST/INFO       RBOR                                      │
└─────────────────────────────────────────────────────────────┘
```

*FIG. 2C*

```
                                    WFADI NDS TICKET (DINDS)
COMMAND                   LOC:                    ALIAS:                    /FOR PASSWORD
CENTER                                                                      PRINTER
WORK ID             C   WORK TYPE    NBR OF UNITS                    TEL

TRACKING KEY                            REQ BY
REFER TO: CENTER              TOUR         LOC
LOAD TO:   ALIAS    RPTCAT                 DATE
CKT STAT                              NTT        TYPE     CUST CONT
CKT ACCESS: D/T            CSU        TO                  CUST CALLBACK
LMOS TTN                              WKG                 SCH APPT
LMOS/TN                                       DPA   COMMIT D/T
TEL#/CKT ID                                              OOS  TSP   DUE D/T
REP SERV ID                                        PN                   CHNL
REPORT                                                                       ES

HIST
TSYS  TEST CD    TEST SUM                                                   #SUB
                              CA+PR/ASSOC.EQ             OTHER              CH
LINE EQ/OE            CTX/MLHG           TGN          TRK ADRS
OFFICE    EQPT              MADE BUSY D/T                 TBL/MEMO
REPT CL                             DATE              TOUR   MTR/EC
STATUS    ASSIGNED TO: ALIAS

CCC000I JUMP SUCCESSFUL
```

*FIG. 3B*

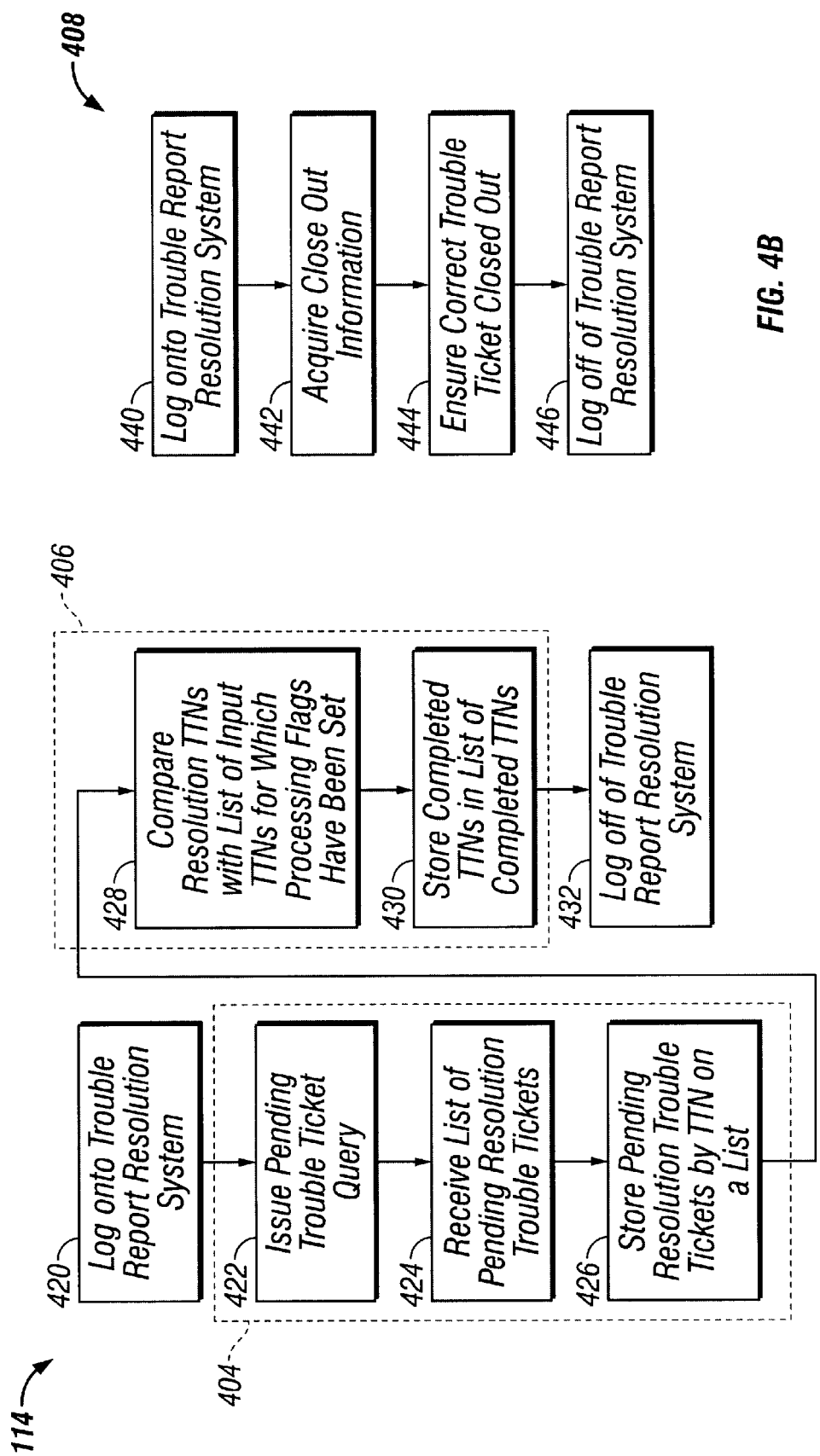

COMMAND: WFADI TBL TKT WORK LIST (DITTWL) /FOR:
CENTER: ALIAS: PASSWORD:
WORK CODE: LOCATION: STATUS: WK-TYPE: TSP:
SORT BY: LOC: STATUS: PRIORITY: WK-TYPE: DUE: LTERM:

C WORK-ID          LOCATION    WK-TYPE TRACKING-KEY                TSP REF-TO:CENTER/LOCATION R/T
 PR ST CH JEP LWTR:ALIAS/DT/TOUR DUE-DT/TM                         LOADED-DT/TM ENTRY-DT/TM OBJ-TM

PAGE    OF    WITH LIMIT OF
CCC000I JUMP SUCCESSFUL

COMMAND
CENTER
WORK ID                                    WFADI COMPL (DITSC)             /FOR
                                           LOC:                 ALIAS:    PASSWORD
                                           C   WORK TYPE   NBR OF UNITS   PRINTER

TRACKING KEY
EST  WP  IST                    RTE/EC        D/T                         JOB ST D/T
FST D    C                      FL1  FL2  FL3          RESTORE            CLOSE      RESOLVE
TRBL CD                         AN CD     TRBL END     TEMP FIX           RPTCAT
REB  MSC                        TOTAL OUTAGE TIME                          D/T
CUST ADV/ACC: NAME                                           TEL
TRBL FOUND/
ACTION TAKEN
(NARRATIVE)

APPARATUS         (DISPOSITION)       NTF          CAUSE
REL   SOFTWARE        NETWORK             ORIG       ENV    C.O.FORCE
SW    PROCESSOR       TRUNK               TERM       DIRT   OTHER FORCE
WIRING PERIPHERAL     MISC                OTHER      WEAR   OTHER
CKT PACK  DIST FRAME                                 DEFECT

CLEARED BY  DATE/TIME                          DATE     CLEARED TO       DATE/TIME
STATUS      ASSIGNED TO: ALIAS                 JEP      TOUR             MTR/EC
TIME WORKED          PCT COMPTD                         TEAM ALIAS             MGR CK

442

COMMAND
CENTER
WORK ID　　WORK REQUEST HEADER (DIREQ)
　　　　　　LOC:　　　　　　　　　　　　ALIAS:　　　　　　　　PASSWORD　　/FOR
　　　　　C　WORK TYPE　　NBR OF UNITS　　　　　　　　　　　　PRINTER

TRACKING KEY
REFER TO: CENTER　　　　　　REQ BY　　　ORDER　　　　　　　　　TEL
LOAD TO: ALIAS　　　TOUR　　LOC　　　　CUSTOMER
TEL #/CKT ID　　　　　　　　DATE　　　　　　　　　　　　　　CKT ACTION
DUE DATE/TIME　　　　　　LATE START　EARLY START
EST TIME: FIRST　　　NEXT　　TOTAL　　PRIORITY　　　　　　　TRICK PREF
　　EB　　BU　　　　LNP　　　TSP　　　ORIGINATOR

HANDOFF CENTER　　　　　　　ORIGINATING LOC
REPORT

START DATE/TIME
　　　　　　　　　　　　　　　　　　　　　　　　OBJECT DATE/TIME
　　　　　　　　　　　　　　　　　　　　　　　　ENTRY DATE/TIME
　　　　　　　　　　　　　　　　　　　　　　　　LOADED DATE/TIME
　　　　　　　　　　　　　　　　　　　　　　　　COMPTD DATE/TIME
　　　　　　　　　　　　　　　　　　　　　　　　COMPTD BY ALIAS

STATUS　　　ASSIGNED TO: ALIAS　　　　DATE　　TOUR　　LPS　　# TIMES LOADED
TIME WORKED　　PCT COMPTD　　　　　　　JEP　　MTR/EC
CCC0001 JUMP SUCCESSFUL

*FIG. 4E*

INTERFACE FOR TROUBLE REPORT INPUT SYSTEM AND TROUBLE REPORT RESOLUTION SYSTEM

BACKGROUND

1. Field of Invention

The present invention relates generally to the field of servicing subscriber trouble reports by telephone company service centers. More specifically, the present invention relates to interfacing a telephone company trouble report input system, into which the trouble report information is entered and stored, with a telephone company trouble report resolution system, that allows technicians to access trouble reports so that they can be resolved.

2. Background of the Invention

When a telephone subscriber has a problem with telephone service, he or she contacts a telephone company service center to inform the telephone company of the problem. An operator working in the telephone company service center obtains information describing the trouble from the subscriber, and uses the information obtained to create a trouble report. The trouble report is stored on a trouble report input system.

The operator creates the trouble report by navigating through a series of input screens termed "masks." The masks provide a format of fields into which the operator enters the information. One such trouble report input system is the Loop Maintenance Operating System (LMOS) system used by BellSouth Telecommunications, Inc. of Atlanta, Ga. In conventional systems, the trouble report input system generates a hardcopy ticket, which is a paper copy of the trouble report.

The hardcopy ticket is carried to a trouble report resolution system. An operator sitting at a terminal connected to the trouble report resolution system receives the hardcopy ticket and uses the information contained in the hardcopy ticket to create an entry in the trouble report resolution system. Technicians can access such entries to see what problems have been reported. One such trouble report resolution system is the Work Force Administration Dispatch In (WFA-DI) system used by BellSouth Telecommunications, Inc. of Atlanta, Ga.

There are two possible resolutions for a trouble report. First, the technician can fix the problem reported by the subscriber. Second, the technician can determine that the problem must be referred to another department within the telephone company for resolution. The information describing the resolution of the hardcopy ticket, whether fixed or referred to another department, is output by the trouble report resolution system as a hardcopy. This hardcopy is carried back to the trouble report input system where an operator inputs the resolution of the hardcopy ticket in the trouble report input system.

One problem with conventional systems is that a person is required to monitor the trouble report input computer system to determine when new trouble reports are entered. In addition, a human operator must generate a hardcopy ticket from a new trouble report and carry it over to the trouble report resolution system. An operator stationed at the trouble report resolution system must then manually enter the information contained on the hardcopy ticket into the trouble report resolution system. When the trouble is resolved, a hardcopy resolution of the trouble report is generated, which must then be carried back to the trouble report input system where an operator manually enters the resolution of the hardcopy ticket.

As can be seen, the conventional system suffers from inefficiency by requiring duplicative manual entry of trouble ticket information, first in the trouble report input system, and second in the trouble report resolution system. Concomitant to this duplicative manual entry is the increased possibility of clerical errors when entering hardcopy information into the trouble report resolution system. Moreover, the conventional system suffers from the drawback of requiring management resources to manage the hardcopy tickets and hardcopy ticket resolutions to prevent their loss, and to assure that the problems reported by subscribers are indeed resolved.

SUMMARY OF THE INVENTION

The present invention is an electronic interface between a telephone company's trouble report input system and its trouble report resolution system that solves the problems associated with conventional systems. The interface eliminates the need for the trouble report input system to generate a paper ticket that must be carried and entered into a trouble report resolution system.

As in conventional systems, an operator receives a call and generates a trouble report which is stored in the trouble report input system as an electronic trouble ticket. The interface of the present invention continually, periodically or on command monitors the trouble report input system for the presence of new electronic input trouble tickets. When the interface finds a new electronic input trouble ticket, it acquires the information contained therein and uses it to build a resolution trouble ticket in a format that the trouble ticket resolution system can process. The trouble ticket resolution system provides the trouble information to a technician who either fixes the problem reported by the subscriber or determines that it must be referred to another department for resolution. The resolution of the resolution trouble ticket, whether fixed or referred, is forwarded by the trouble report resolution system to the trouble report input system, where it is used to close out the input trouble ticket corresponding to the resolution trouble ticket.

In a preferred embodiment of the present invention, the interface described above includes four processes to resolve trouble tickets. The first process obtains new input trouble tickets from the trouble report input system, and places trouble ticket numbers corresponding to those input trouble tickets in a process list. The second process obtains information from the input trouble tickets corresponding to the trouble ticket numbers in the process list, and uses it to create corresponding resolution trouble tickets in a format that the trouble report resolution system can process. The third process determines which resolution trouble tickets have been resolved, and stores trouble ticket numbers corresponding to the resolved resolution trouble tickets in a resolved list. The fourth process closes out the input trouble tickets on the trouble report input system that have numbers corresponding to the resolution trouble tickets on the resolved list.

Thus, one object of the present invention is to provide an interface between a telephone company's trouble report input system and trouble report resolution system.

Another object of the present invention is to eliminate the management tasks required to handle hardcopy trouble tickets and hardcopy resolution reports.

Another object of the present invention is to increase the speed with which trouble reports and trouble report resolutions are exchanged between a telephone company's trouble report input system and its trouble report resolution system.

These and other objects of the present invention are described in greater detail in the detailed description of the invention, the appended drawings and the attached claims.

BRIEF DESCRIPTION OF THE DRAWINGS

FIG. 1A is a flow chart for an interface operating according to a preferred embodiment of the present invention.

FIG. 2A is a flow chart for a process for getting input trouble tickets and details associated with those trouble tickets from a trouble report input system according to a preferred embodiment of the present invention.

FIG. 2B is an exemplary blank input mask according to a preferred embodiment of the present invention.

FIG. 2C is an exemplary blank details request mask according to a preferred embodiment of the present invention.

FIG. 3B is an exemplary blank resolution trouble ticket build mask according to a preferred embodiment of the present invention.

FIGS. 4A and 4B are flow charts for a process for determining which resolution trouble tickets have been processed according to a preferred embodiment of the present invention.

FIG. 4C is an exemplary blank pending ticket query mask according to a preferred embodiment of the present invention.

FIG. 4D is an exemplary blank close out information request mask according to a preferred embodiment of the present invention.

FIG. 4E is an exemplary blank close out time request mask according to a preferred embodiment of the present invention.

DETAILED DESCRIPTION OF THE PREFERRED EMBODIMENTS

The interface of the present invention accesses the trouble report input and trouble report resolution systems through the conventional interface associated with each system. It uses a series of masks designed to put the required information in the trouble report input and resolution systems. This information is stored as "tickets." The terms "ticket," "trouble ticket," and "electronic trouble ticket" are used interchangeably throughout this specification to refer to information related to the subscriber's trouble report as stored electronically on the trouble report input system and the trouble report resolution system. Tickets stored on the trouble report input system are also referred to herein as "input trouble tickets." Corresponding tickets stored on the trouble report resolution system are also referred to herein as "resolution trouble tickets."

The interface navigates through the masks using a set of tables that contains information that controls what the interface is looking for and where to route a trouble report. Exemplary data for inclusion in the tables is described in Tables 1 and 2 below. It would be apparent to those skilled in the art that Tables 1 and 2 provide only examples of the data that may be provided to an interface such as that of the present invention, but are not meant to be exhaustive, and that other data might be required for a particular task within the scope and spirit of the present invention.

Figure 1:
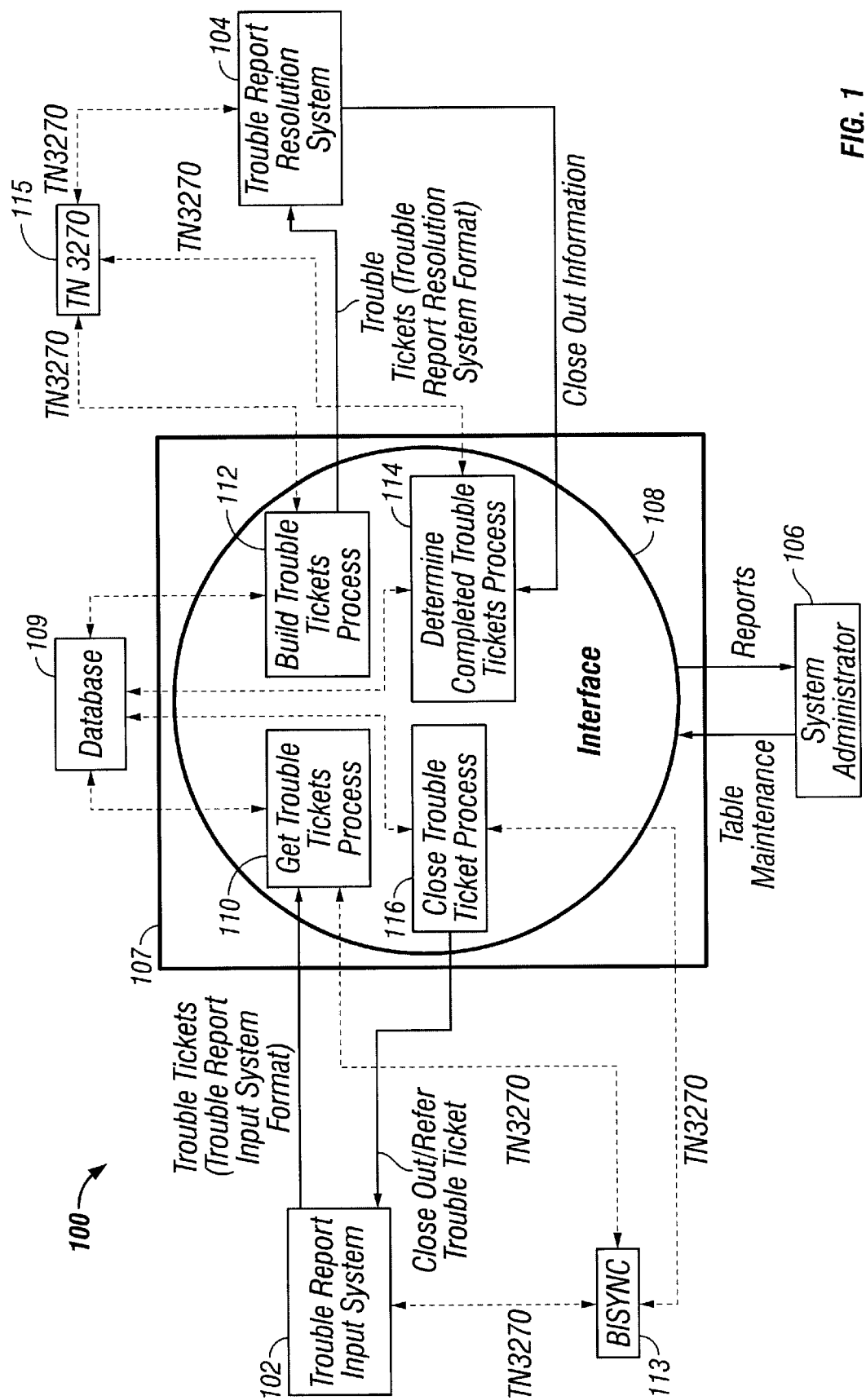
FIG. 1 is a schematic diagram illustrating a system for processing trouble reports using an interface according to a preferred embodiment of the present invention.

FIG. 1 is a schematic diagram illustrating a trouble report processing system 100 according to a preferred embodiment of the present invention. FIG. 1 also shows the data flows between the processes of system 100. System 100 comprises a trouble report input system 102, trouble report resolution system 104, a system administrator 106 and an interface 108 executing on a computer 107. Interface 108 provides communication between trouble report input system 102, trouble report resolution system 104 and system administrator 106. Preferably interface 108 comprises four processes. These processes include (1) a process 110 to get new trouble tickets that have been added to trouble report input system 102 to be sent to trouble report resolution system 104; (2) a process 112 to build trouble tickets in a format that the trouble report resolution system can process, and to store on the trouble report resolution system; (3) a process 114 to determine which tickets have been resolved on the trouble report resolution system and to get close out information corresponding to those tickets; and (4) a process 116 to close or refer trouble resolution tickets on the trouble report input system using the close out information.

Interface 108 can execute on any computer capable of executing the steps described above, for example, computer 107. Preferably, computer 108 is a personal computer or mini computer. Such computers are well known in the art and need not be described further. It would be apparent to those skilled in the art that interface 108 can execute on either trouble report input system 102 or trouble report resolution system 104 as well.

An input trouble ticket originates on trouble report input system 102 when an operator inputs information relating to a trouble call from a telephone subscriber. The information is stored on trouble report input system 102 as an input trouble ticket. Using routing information contained in the administrative tables, for example, RTE codes 450 and 550 in Table 2, interface 108 determines which input trouble tickets are to be routed to trouble report resolution system 104.

When interface 108 determines that the trouble ticket must be forwarded to trouble report resolution system 104, interface 108 logs into trouble report resolution system 104 using a terminal emulator 115 such as the well-known Telnet 3270 terminal emulator. For example, terminal emulation 115 executes on a VTAM server from Apertus Technologies, Inc. of Eden Prairie, Minn. Using terminal emulator 115, process 112 traverses masks associated with trouble report resolution system 104 using the information in the trouble ticket from trouble report input system 102 to create a resolution trouble ticket in a format that can be processed by trouble report resolution system 104. This resolution trouble ticket is stored on trouble report resolution system 104. Technicians can obtain stored resolution trouble tickets from trouble report resolution system 104.

A technician can resolve a resolution trouble ticket in one of two ways. First, the technician can fix the trouble reported by the subscriber. Second, the technician can determine that the trouble report should be referred to another department for resolution. The technician enters information pertaining to resolution of the resolution trouble ticket into trouble report resolution system 104. Process 114 of interface 108 accesses the resolution information from trouble report resolution system 104 and forwards it to process 116 of interface 108. Process 116 passes the resolution information to trouble report input system 102 so that the input trouble ticket corresponding to the resolution trouble ticket can be closed out or referred to another department, as indicated by the resolution information. Completion of processes 110, 112, 114 and 116 completes one "cycle" of the trouble report processing system of the present invention.

FIG. 1A is a flow chart of the four steps executed by the process of interface 108 according to a preferred embodiment of the present invention. In step 110, the process gets a new input trouble ticket. Using the information contained in this trouble ticket, the process builds a trouble resolution ticket in step 112. The process then determines which resolution trouble tickets have been resolved in step 114 and closes out or refers input trouble tickets corresponding to processed resolution trouble tickets in step 116. Processes 112, 114, 116 and 118, corresponding to steps 110, 114, 116 and 118 in flow chart 1A are described in more detail below.

Figure 2:
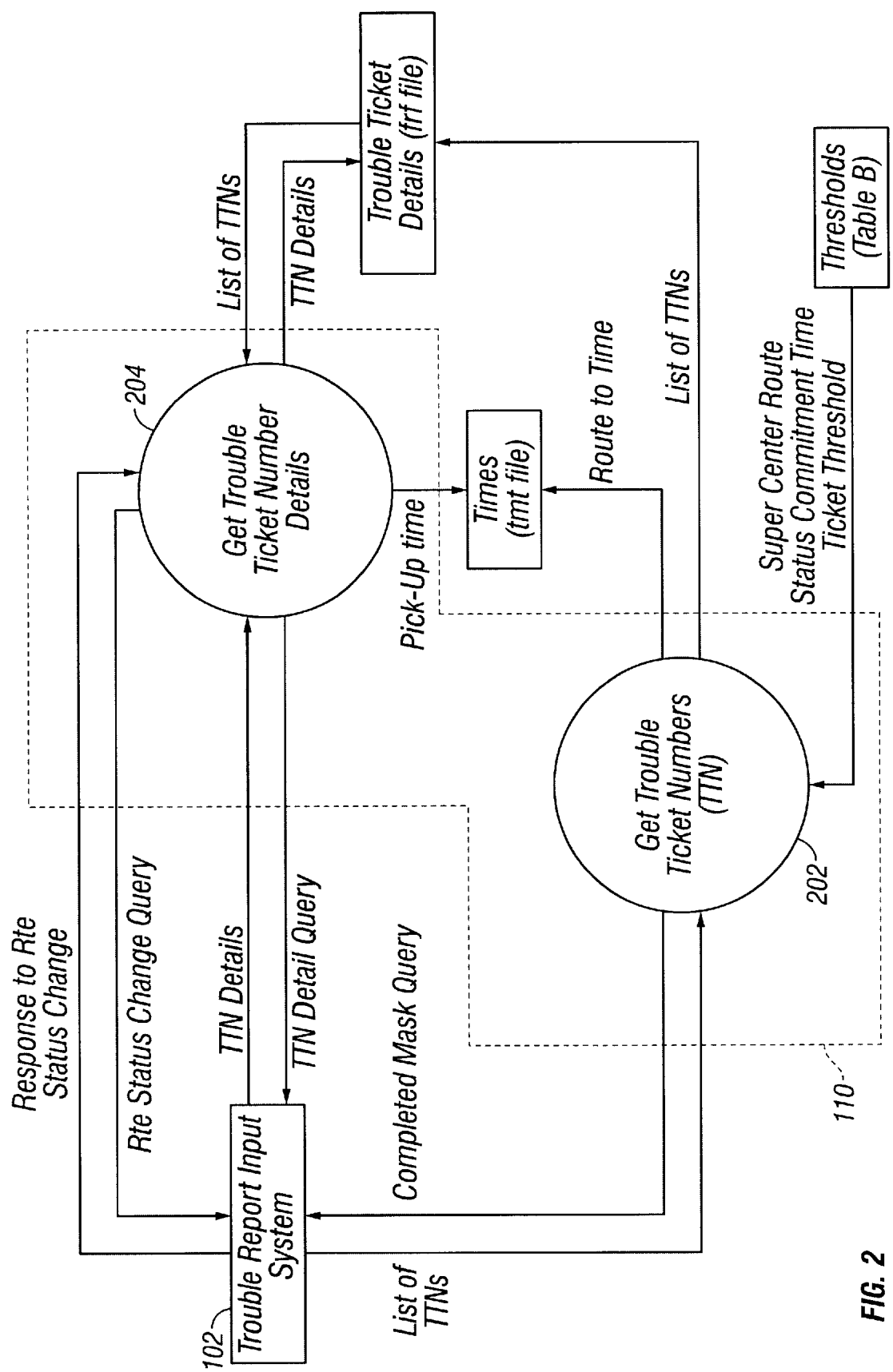
FIG. 2 is a schematic diagram illustrating a process for getting input trouble tickets and details associated with those trouble tickets from a trouble report input system according to a preferred embodiment of the present invention.

Process 110 of interface 108 for obtaining the trouble ticket from trouble report input system 102 is illustrated schematically in FIG. 2. Process 110 includes two primary processes, a process 202 for getting trouble ticket numbers and a process 204 for getting trouble ticket number details. Using process 202, interface 108 accesses trouble report input system 102 by navigating through a series of input screens known as masks. Preferably this access is performed by a terminal emulator executing on a server 113. The terminal emulator used to communicate with trouble report input system 102 in a preferred embodiment of the present invention is the well-known Telnet 3270 terminal emulator executing on a BISYNC server from Apertus Technologies, Inc. of Eden Prairie, Minn.

Process 202 completes data fields contained in the input masks using the system information stored in tables (and described by example in more detail in Tables 1 and 2 below). An exemplary blank input mask 200 showing exemplary data fields to be completed by process 202 is provided in FIG. 2B. The data fields include such information as the maintenance center to which the trouble was reported, route codes advising the interface where the input trouble ticket should be routed and status indicating that the input trouble ticket should be dispatched inside, i.e., not referred to another department for processing. The completed mask forms a request or query to trouble report input system 102. The query requests a list of input trouble tickets, preferably by trouble ticket number (TTN), corresponding to trouble tickets whose information meets the criteria of the completed mask.

In response to the trouble report input, system 102 sends a list of input TTNs to process 202 according to a set of thresholds. Referring to the exemplary thresholds given in Table 2, for example, trouble report input system 102 checks to be sure that the number of input trouble tickets being routed to dispatched in (DPI) 450 or 550 route to codes for central office, does not exceed a certain number, for example 25, as indicated by the "bypass threshold amount 25" in Table 2. The thresholds value is a fail-safe to prevent large numbers of input trouble tickets being routed to the central office if there is a failure of the system during a cycle. During normal operation, the number of input trouble tickets routed to trouble report resolution system 104 during a given cycle is not expected to exceed the threshold value. The threshold value can also be a time commitment. For example, the telephone company may guarantee that the problem will be resolved within 48 hours. In that case, process 202 will transfer any input trouble tickets that must be processed within 48 hours to trouble report resolution system 104.

Process 202 further reviews each input trouble ticket corresponding to an input TTN returned in response to the query to determine whether it has already been picked up for processing, that is, forwarded to trouble report resolution system 104. In the preferred embodiment, this is done by checking a processing flag associated with the input trouble tickets that indicates whether the input trouble tickets are already in the trouble report input system database. As described below, this flag is set by process 204. Process 202 stores each input TTN meeting the threshold requirements that has not been previously processed in a list of input TTNs to be processed.

Process 204 accesses the stored list of input TTNs to be processed, to get detailed information pertaining to each input trouble ticket corresponding to each input TTN stored in the list from trouble report input system 102. Process 204 obtains this information by completing a mask for each input TTN stored in the list. An exemplary blank details request mask is provided in FIG. 2C. The completed mask is submitted as a query to trouble report input system 102. In response to the query, trouble report input system 102 sends the detailed information for each trouble ticket corresponding to each TTN in the stored trouble ticket list. The detailed information includes information to support a technician who will work on a resolution trouble ticket corresponding to the input trouble ticket from which the information is derived, and is described by example in Table 1. Process 204 stores JIS the obtained information in a database associated with interface 108, for example, database 109. Preferably, this information is stored in a trouble ticket details file. The information in the trouble ticket details file is described by example in more detail in Tables 1 and 2 below.

In addition to acquiring the additional information, process 204 changes the status of the input trouble ticket to reflect that interface 108 has picked the input trouble ticket up. In a preferred embodiment of the present invention, this is done by setting a status flag associated with the ticket in the database.

After process 204 has obtained and stored detailed information corresponding to each input trouble ticket corresponding to a TTN stored in the input TTN list, interface 108 logs out of trouble report input system 102 and logs onto trouble report resolution system 104. Once logged onto trouble resolution system 104, interface 108 uses the detailed trouble ticket information stored in database 109 to build a resolution trouble ticket that can be processed by the trouble report resolution system 104.

FIG. 2A is a flow chart illustrating the operation of process 110 according to a preferred embodiment of the present invention. In step 220, process 110 logs onto trouble report input system 102. Process 110 then accesses and completes a trouble ticket number request mask (see FIG. 2B) to get input trouble ticket numbers corresponding to input trouble tickets that need to be processed. In step 224, process 110 receives a list of the input trouble ticket numbers that need to be processed. In step 226, process 110 determines which TTNs correspond to trouble tickets that have not been previously designated for processing. In step 228, process 110 stores the TTNs corresponding to trouble tickets that have not yet been designated for processing in a process list of input TTNs to be processed. Steps 222, 224, 226 and 228 correspond to process 202. Process 110 continues in step 232 by completing a details request mask 250 to obtain detailed data pertaining to each input trouble ticket corresponding to a TTN in the input TTN list generated in step 228. FIG. 2C shows an exemplary details request mask 250 having exemplary data fields to be completed by process 110. Process 110 receives the detailed data in step 234. In step 236, process 110 stores the detailed data in a trouble ticket details file on database 109. Steps 232, 236 and 238 correspond to process 204. Process 110 then logs off of trouble report input system 102 in step 238.

Figure 3:
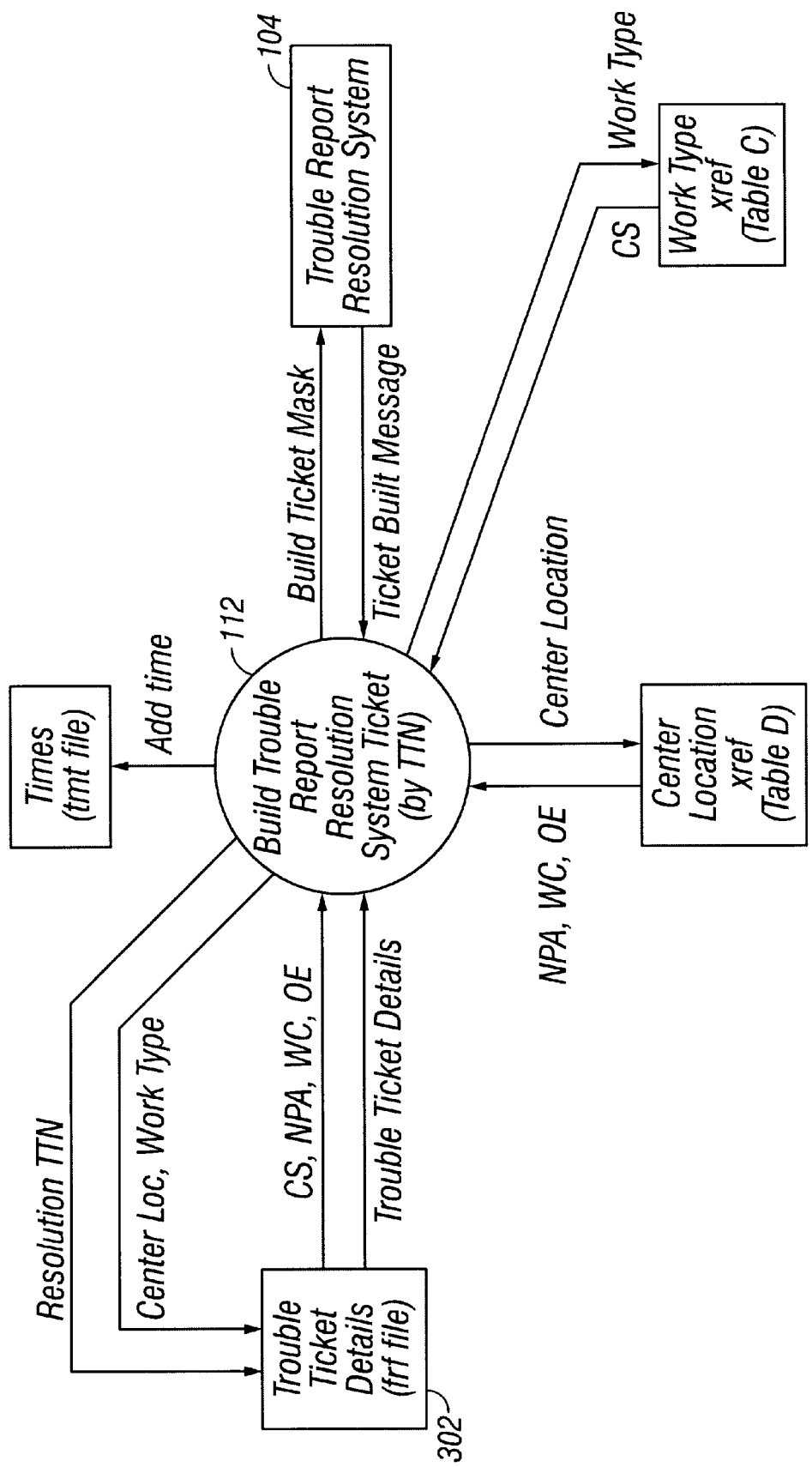
FIG. 3 is a schematic diagram illustrating a process for building a resolution trouble ticket in a format that a trouble report resolution system can process according to a preferred embodiment of the present invention.

Referring to FIG. 3, a process 112 of interface 108 for building a resolution trouble ticket according to a preferred embodiment of the present invention is described. Process 112 uses a build mask to build a resolution trouble ticket in a format that trouble report resolution system 104 can process. An exemplary blank resolution trouble ticket build mask 300 showing exemplary data fields to be completed by process 112 is provided in FIG. 3B. Using the information previously stored in database 109 of interface 108, process 112 populates the fields of the build mask to build the resolution trouble ticket for processing by trouble report resolution system 104. In the preferred embodiment, process 112 builds the resolution trouble ticket using information previously stored in the trouble ticket details file on database 109, for example trouble ticket details file 302. As shown in FIG. 3, process 112 queries database 109 to get the trouble ticket details and other information (class of service, work center, NPA and office equipment) stored in trouble ticket details file 302 required to build the resolution trouble ticket.

After the resolution trouble ticket is built, trouble report resolution system 104 sends a message back to interface 108 indicating that one or more new resolution trouble tickets have been built that need to be resolved. In addition, process 112 stores a resolution TTN corresponding to the newly created resolution trouble ticket along with other information (work center location and work type) in trouble ticket details file 302. For tracking purposes, process 112 also stores the time that each new resolution ticket was built. In addition, process 112 obtains the class of service of the subscriber that submitted the trouble report. Finally, using the information stored in database 109, process 112 determines the correct work center to process the resolution trouble ticket.

As described above, in the preferred embodiment of the present invention, interface 108 notifies the work center that one or more new resolution trouble tickets have been built. To provide this notification, process 112 presents a popup window on a screen of a personal computer in the work center indicating that the one or more new resolution trouble tickets have been built. Preferably, the one or more newly built resolution trouble tickets are added to a resolution trouble ticket list displayed in a window that is already on the computer screen. In this case, if the resolution trouble ticket list is already showing on the screen, an alarm (for example, a beep) can be supplied to notify an operator that one or more new resolution trouble tickets have been added to the list. Alternatively, there is a pop-up window for each new resolution trouble ticket created that is displayed on the computer screen. Automatically informing work center personnel of the presence of new resolution trouble tickets requiring resolution relieves those personnel of the task of constantly monitoring trouble report resolution system 104 to see if new resolution trouble tickets have been added. After presenting any required pop-up windows, interface 108 preferably logs out of trouble report resolution system 104.

Figure 3A:
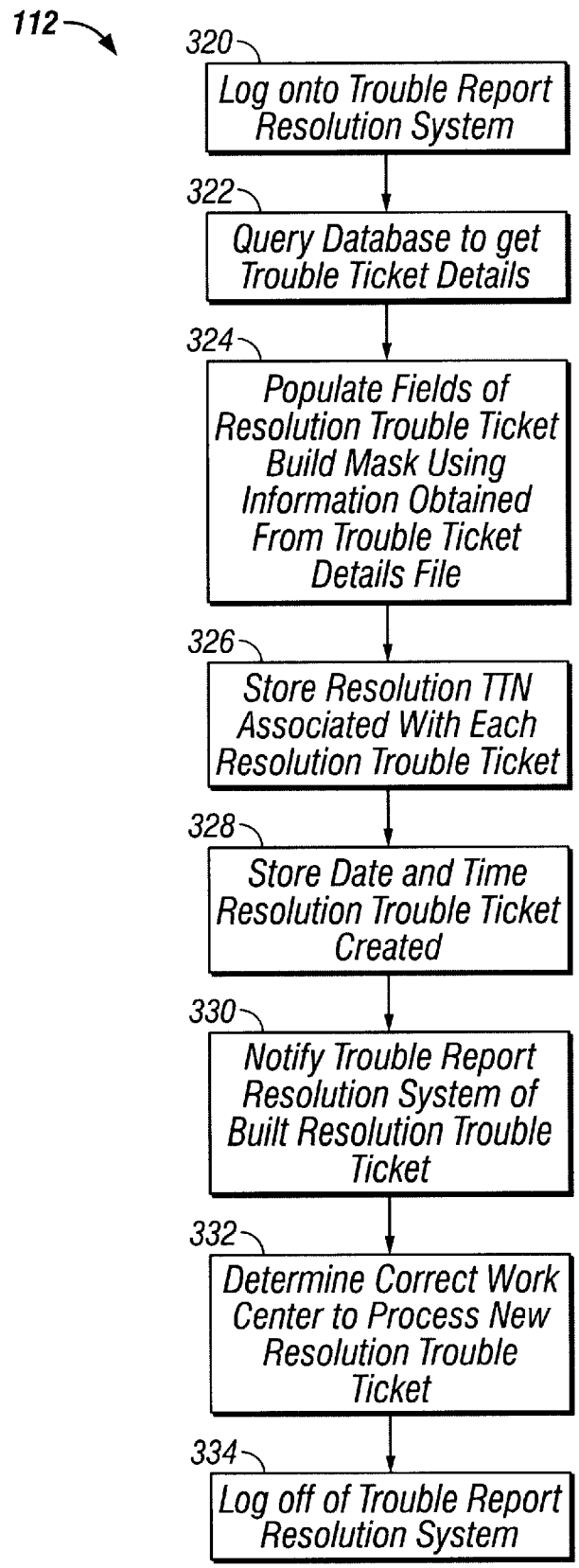
FIG. 3A is a flow chart for a process for building a resolution trouble ticket in a format that a trouble report resolution system can process according to a preferred embodiment of the present invention.

FIG. 3A is flow chart illustrating the operation of process 112 according to a preferred embodiment of the present invention. Process 112 first logs onto trouble report resolution system 104 in step 320. Once logged in, process 112 queries database 109 to obtain trouble ticket details corresponding to the new trouble ticket information stored in the database 109 in step 322. Using this information, process 112, populates the fields of a resolution trouble ticket build mask (see FIG. 3B) in step 324. Process 112 stores a resolution TTN for each of the newly built resolution trouble tickets in step 326. In step 328, process 112 stores the date and time that the resolution trouble ticket is created. In step 330, process 112 notifies trouble report resolution system 104 of the newly built resolution ticket or tickets. In the preferred embodiment, process 112 determines the correct work center to process the newly created trouble ticket in step 332. When the new resolution trouble tickets or tickets have been built, process 112 logs out of trouble report system 104 in step 334.

Figure 4:
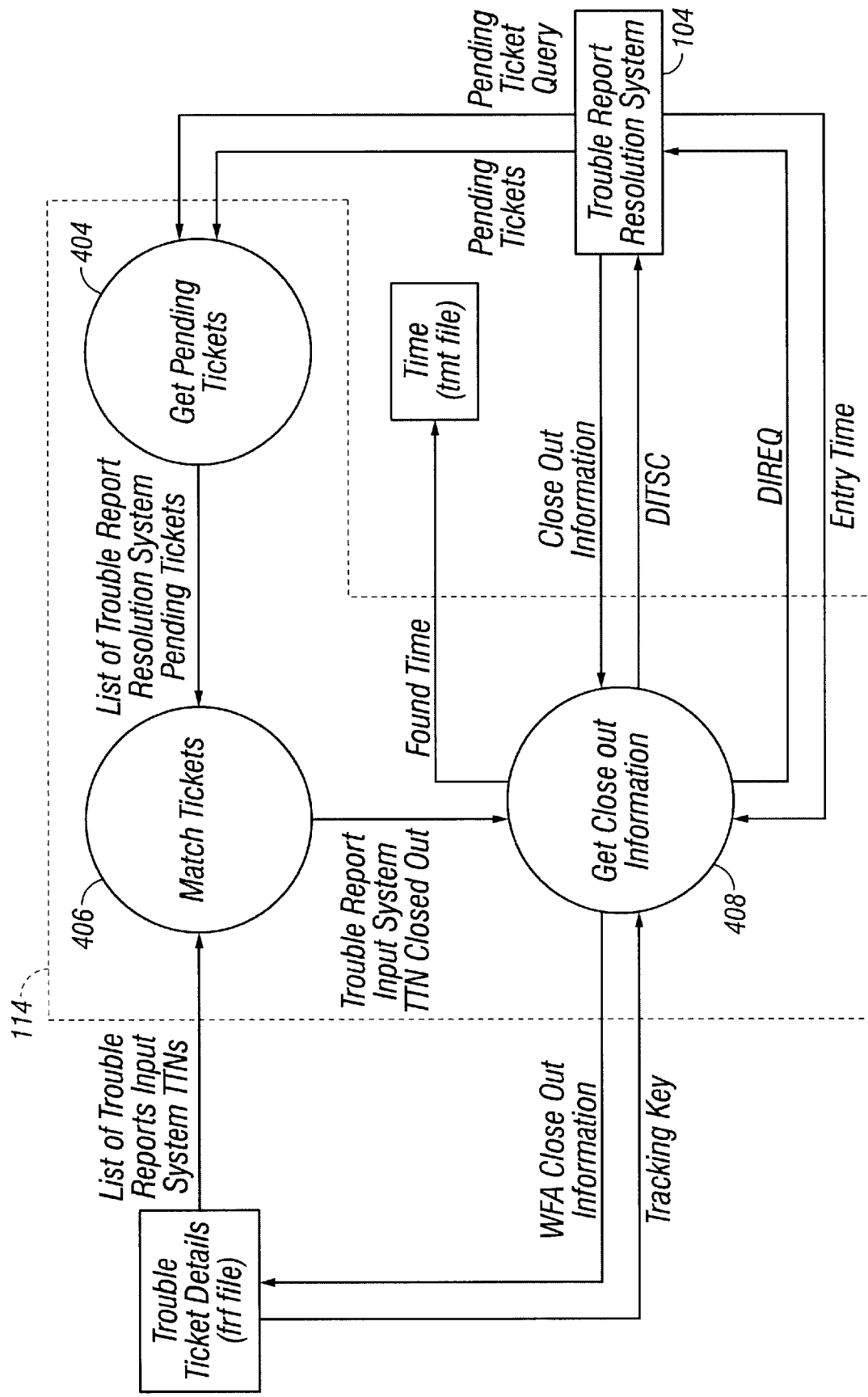
FIG. 4 is a schematic diagram illustrating a process for determining which resolution trouble tickets have been processed according to a preferred embodiment of the present invention.

After interface 108 has built the one or more new resolution trouble tickets, it logs back into trouble report resolution system 104 using process 114. A schematic diagram of process 114 is provided in FIG. 4. Process 114 includes a process 404 to get a list of resolution trouble tickets pending action on trouble report resolution system 104, a process 406 to determine which resolution trouble tickets are no longer pending action on trouble resolution system 104, and a process 408 to obtain close out information when input trouble tickets are to be closed out or referred to another department for ultimate resolution. Using processes 404 and 406, interface 108 logs back onto trouble report resolution system 104 to determine which, if any, resolution trouble tickets have been completed.

To determine which resolution trouble tickets have been completed, process 404 issues a pending ticket query to trouble report resolution system 104 to obtain a list of resolution trouble tickets pending action by trouble report resolution system 104. An exemplary blank pending ticket query mask 400 showing exemplary data fields to be completed by process 404 is provided in FIG. 4C. Trouble report resolution system returns a list of resolution trouble tickets, preferably by resolution trouble ticket number (TTN), pending action by trouble report resolution system 104 to process 404. Process 404 stores the list of pending resolution trouble tickets by resolution TTN. Any resolution trouble tickets corresponding to resolution TTNs appearing on the list have not been completed. Therefore, any resolution trouble tickets having numbers corresponding to resolution TYNs that do not appear on that list, but for which the processing flag (described above) associated with the input trouble ticket corresponding to the resolution trouble ticket has been set have been completed, i.e., the trouble has been resolved or the corresponding input trouble ticket should be referred to another department for resolution.

To determine which resolution trouble tickets have been completed, process 406 compares the resolution TTNs stored in the list with input TTNs corresponding to input trouble tickets for which processing flags have been set. Any resolution trouble tickets corresponding to input trouble tickets for which processing flags have been set, but whose TTN does not appear on the pending resolution trouble ticket list are considered completed, i.e., the trouble reported has been corrected or it has been determined that the corresponding input trouble ticket should be referred to another department for resolution. Process 406 stores a list of the completed resolution trouble tickets, preferably by trouble ticket number. The resolution trouble tickets whose TTNs make up this list are tickets that are to be closed out or referred to another department. Process 406 passes this list to process 408.

Process 408 logs onto trouble report resolution system 104 to acquire information for each resolution trouble ticket in the list required to close out the corresponding input trouble ticket, including for example, tracking key, work performed code, trouble found, action taken, customer advised/not, cleared by, date and time cleared, disposition, cause, or information needed to refer ticket to another department; work performed code, work group routed to, route code, and narrative of why routed. An exemplary blank close out information request mask 440 showing exemplary data fields to be completed by process 408 is provided in FIG. 4D. This information is listed as "trouble report resolution system 104 close out information" in Table 1. Process 408 also obtains the time that each input trouble ticket is closed out. An exemplary blank close out time request mask 442 showing exemplary data fields to be completed by process 408 is provided in FIG. 4E. The tracking key is compared to the tracking key obtained from the input trouble ticket list stored in trouble report system 102 to ensure that the proper input trouble ticket is being closed out. Process 408 also stores the time that the trouble corresponding to the input trouble ticket was found in a times data storage file. This information is stored for each input trouble ticket to be closed out.

FIG. 4A is a flow chart illustrating a process 114 according to a preferred embodiment of the present invention. Referring to FIG. 4A, in step 420, process 114 logs onto trouble report resolution system 104. In step 422, process 114 issues a pending resolution trouble ticket query (see FIG. 4C) to obtain a list of trouble tickets pending resolution by trouble ticket resolution system 104. In step 424, process 114 receives a list of resolution TTNs corresponding to resolution trouble tickets still pending resolution by trouble report resolution system 104. The resolutions TTNs so returned are stored in a list of resolution TTNs corresponding to resolution trouble tickets pending resolution by trouble report resolution system 104 in step 426. Steps 422, 424 and 426 correspond to process 404 described above.

Process 114 continues in step 428 where it compares the TTNs stored on the list of resolution TTNs generated in step 426 with a list of input TTNs for which processing flags have been set. Process 114 stores any TTNs which do not match in a list of completed resolution TTNs in step 430. The TTNs stored in the list generated in step 430 correspond to resolution trouble tickets for which processing has been completed. Steps 428 and 430 correspond to process 406 described above. In step 406, process 114 logs off of trouble report resolution system 104.

FIG. 4B is a flow chart illustrating a process 408 according to a preferred embodiment of the present invention. Referring to FIG. 4B, process 408 begins in step 440 where it logs onto trouble report resolution system 104. In step 442, process 408 acquires close out information (see FIG. 4D) corresponding to resolution trouble tickets for which processing has been completed, as indicated by the resolution TTNs stored in the list generated in step 432. In step 444, process 408 compares the tracking key of the input trouble ticket to be closed with the corresponding tracking key of the completed trouble resolution ticket to be sure that the correct input trouble ticket is being closed out. Process 408 then logs off of trouble report resolution system 104.

Figure 5:
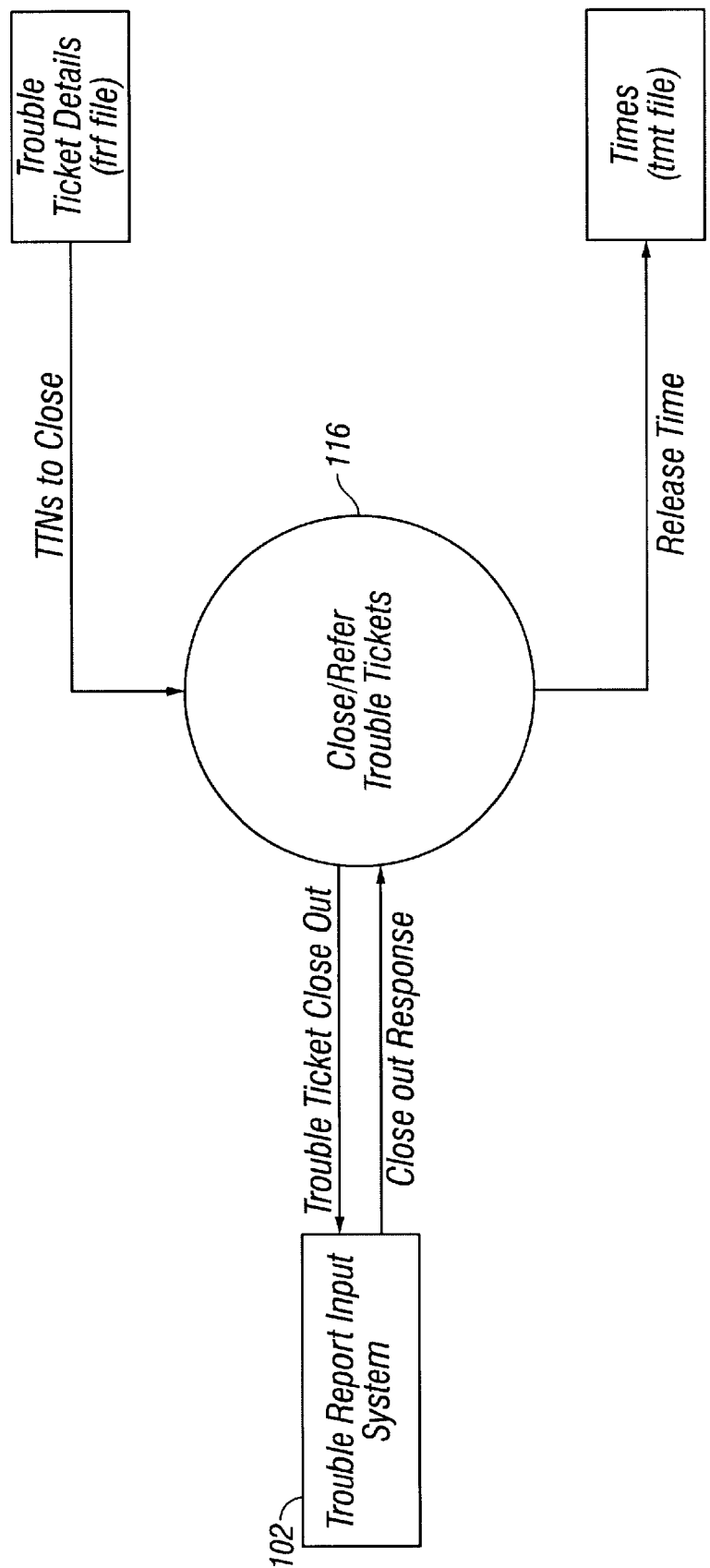
FIG. 5 is a schematic diagram illustrating a process for closing out processed input trouble tickets according to a preferred embodiment of the present invention. to FIG. 5A is a flow chart of a process for closing out processed input trouble tickets according to a preferred embodiment of the present invention.

Referring to FIG. 5, interface 108 uses process 116 to close out the input trouble tickets on trouble report input system 102. Process 116 obtains the list of input TTNs to close. Using terminal emulator 113, process 116 logs onto trouble report input system 102 and closes out input trouble tickets in trouble report input system 102 that have numbers corresponding to those in the list of input TTNs to be closed out. Process 116 receives a close out response from trouble report input system 102 indicating that the input trouble tickets having numbers corresponding to those in the list of input TTNs to be closed out have been closed out. Upon receiving the close out response, process 116 releases the input trouble ticket and stores the time that the input trouble ticket was released in a time store file.

Figure 5A:
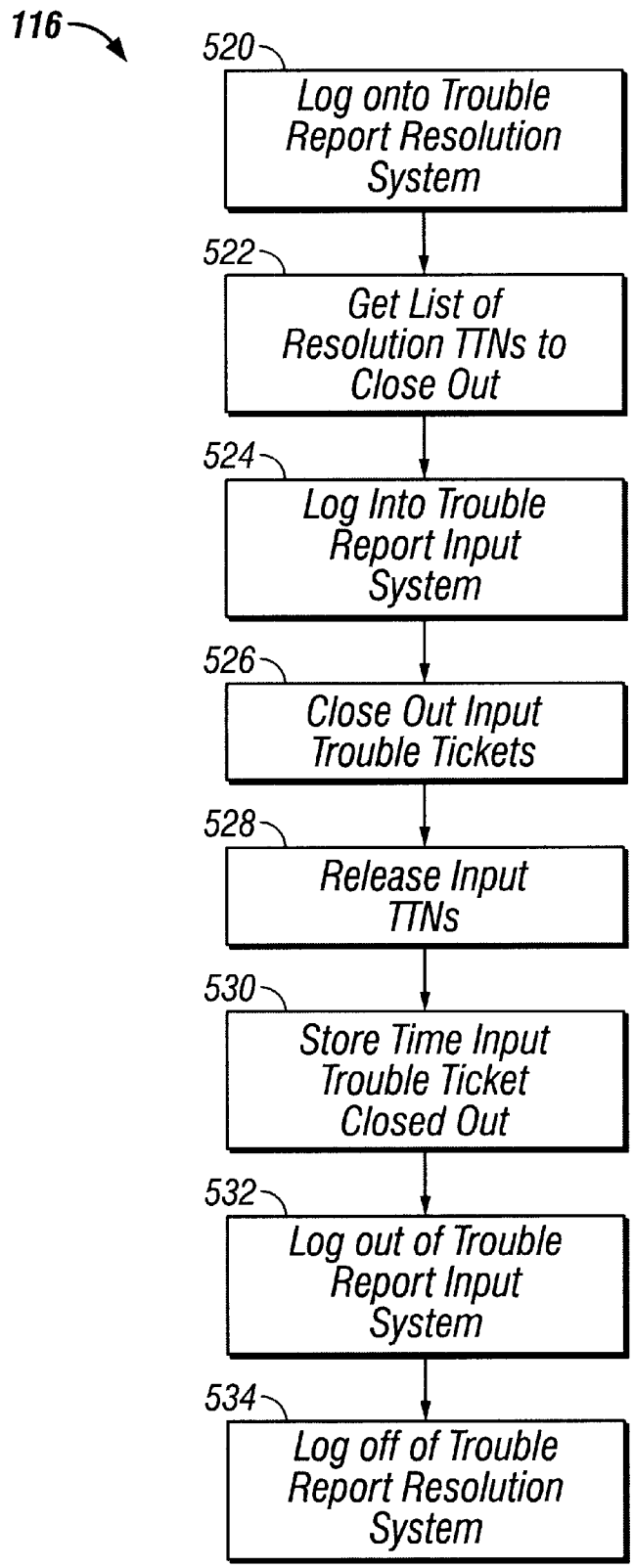
FIG. 5A is a flow chart of a process for closing out processed input trouble tickets according to a preferred embodiment of the present invention.

FIG. 5A illustrates a flow chart for a process 116 according to a preferred it embodiment of the present invention. Process 116 begins in step 520 where it logs into trouble report resolution system 104. In step 522, process 116 obtains the list of completed resolution TTNs corresponding to resolution trouble tickets for which processing has been completed (that was generated in step 432 as shown in FIG. 4B). Process 116 logs into trouble report input system 102 in step 524. In step 526, process 116 closes out input trouble tickets and releases corresponding input TTNs in step 528. Process 116 stores the time the input trouble ticket was closed out in step 530. Process 116 then logs out of trouble report input system 102 in step 532 and out of trouble report resolution system 104 in step 534.

Completing one iteration through each of processes 110, 112, 114 and 116 completes one cycle of trouble ticket processing. In summary, a subscriber calls a work center to report a trouble. An operator in the work center inputs the details into trouble report input system 102 using a series of masks to create an input trouble ticket. Interface 108 determines that a new input trouble ticket has been entered and forwards the details of the input trouble ticket to trouble report resolution system 104 in a format trouble report resolution system 104 can process to create a resolution trouble ticket. When the trouble has been resolved or it is determined that the trouble must be resolved by another department, that information is entered into trouble report resolution system 104 and the resolution trouble ticket is removed from the pending resolution trouble ticket list. Interface 108 determines which resolution trouble tickets have been removed from the pending resolution trouble ticket list and sends information corresponding to the resolution of the removed resolution trouble tickets back to trouble report input system 102, which closes out the input trouble tickets corresponding to the removed resolution trouble tickets. As would be apparent to those skilled in the art, interface 108 could stay logged into trouble report resolution system 104, rather than log out and log back into trouble report resolution system 104. However, the log out and log back on process of the preferred embodiment of the present invention better separates the functionality of processes 110, 112, 114 and 116 for description purposes.

Although the foregoing description was in terms of processing lists of input and resolution TTNs, any or all of the information that uniquely identifies a trouble ticket can be used. For example, a portion of, or all of the information in a trouble ticket can be hashed in a well-known manner and stored in a hash table. The trouble tickets are then identified by the hash values stored in the hash table, rather than by TTN.

The following tables provides the data structures (data flows and data stores) used in a preferred embodiment of the present invention.

The exchange of data between various components of a system according to a preferred embodiment of the present invention are termed "data flows." An exemplary set of data flows is provided in Table 1. It would be apparent to those skilled in the art that other data flows can be used within scope and spirit of the present invention.

TABLE 1

Data Flows According to a Preferred Embodiment of the Present Invention

| | |
|---|---|
| Add Time | Time loaded to trouble report resolution system 104 for pick up |
| Center Location | Trouble report resolution system 104 location of center to be accessed |
| CS | Class of Service used by Table "C" to get trouble report resolution system 104 work type |
| DINDS | Trouble report resolution system 104 screen used to build dispatch in ticket and pass on the following information: trouble ticket number, telephone number, commitment, reach number, contact name, class of service, area code, wire center, location, last date cleared, trouble reported, cable, pair, office equipment, test version code and summary, narrative, center location and work type |
| DIREQ | Trouble report resolution system 104 time of close out |
| DITSC | Trouble report resolution system 104 mask used to get close out information for closing trouble report input system 102 |
| DITTWL | Trouble report resolution system 104 work list of pending trouble report resolution system 104 tickets |
| Entry Time | System time ticket closed |
| Found Time | Time close out information picked up from trouble report resolution system 104 |
| List of TTNs | List of trouble status dpi 450, 550 |
| Trouble report input system 102 TTNs Closed Out | List of trouble report input system 102 tickets that should be closed due to match of a trouble report resolution system 104 |
| MCMD-EDJI | Trouble report input system 102 mask used to get TTNs via EDJI |
| MSCR | Trouble report input system 102 mask used to get trouble report details |
| MSCR Close Out | Trouble report input system 102 mask used to close out ticket with work performed code, customer notified/not, employee clearing trouble, date & time cleared, disposition, cause and narrative of found trouble and action taken |
| MSCR for rte Status Change | Mask used to change to dpi 555 |
| MSCR Response | Mask returned for next close out |
| NPA, WC, OE | Items from trouble details used by table "D" to get trouble report resolution center location |
| Pending trouble report resolution system 104 tickets | List of pending trouble report resolution system 104 tickets used in matching trouble report input system 102 ticket |
| Pick Up Time | Time TTN details picked up |
| Response to Rte Status Change | New MSCR mask for next ticket |
| Route to Time | Time TTNs filed |
| Super Center, route status, commitment time and ticket threshold | Thresholds used in accessing trouble report input system 102 using table "B" |
| Ticket Built message | Message confirming ticket built and trouble report resolution system 104 ticket number |
| Tracking Key | NPA, TN, TTN used to verify valid trouble report input system 102 ticket |
| TTN details | Details from trouble report: Telephone number - telephone number reporting trouble Commitment - time by which subscriber promised to have trouble resolved Reach number - number where subscriber can |

TABLE 1-continued

Data Flows According to a Preferred Embodiment of the Present Invention

| | |
|---|---|
| | be reached<br>Contact name - subscriber name<br>Class of service - type of service being provided to subscriber, e.g., business or residential<br>Area Code (NPA)<br>Wire Center (WC) - central office where subscriber is located<br>Location - location of wire center<br>Last date cleared - last instance where subscriber reported problem with telephone service<br>Trouble reported - problem with telephone service reported by subscriber<br>Cable - identification of tip and ring cable pair that physically connects to subscriber location<br>Pair - identification of tip and ring cable pair that physically connects to subscriber location<br>Office Equipment - office equipment for the switch that the technician works off of to get dial tone<br>Test (version code & summary) - describes any diagnostics performed and results of those diagnostics<br>Narrative - any other detail included to describe resolution of the trouble report |
| TTNs to Close | List of trouble tickets to be closed in trouble report input system 102 |
| Trouble report system resolution system 104 close out information | Information used to close out/refer trouble report input system 102 ticket; customer advised/not advised, cleared by, date & time, disposition, cause, or information need to refer ticket to another department; work performed code, work group routed to, route code and narrative of why re-directed |
| Trouble report resolution system 104 ticket number | Ticket number assigned to dispatch in ticket |
| Work type | Type of work used in routing trouble report resolution system 104 ticket to a technician |

In the preferred embodiment, the tables that are maintained in interface 108 to control its processing are termed "data stores." An exemplary set of data stores according to a preferred embodiment of the present invention are described in Table 2. It would be apparent to those skilled in the art that other data stores can be implemented within the scope and spirit of the present invention.

TABLE 2

Data Stores According to a Preferred Embodiment of the Present Invention

| | |
|---|---|
| Center Location (referred to as Table D) | Table used in directing trouble report system 104 tickets to the proper center, list of trouble report resolution system 104 center names and locations by NPA & work center (WC). This table contains pairs of NPA-NXXs for the wire centers and their corresponding locations |
| Thresholds (referred to as Table "B") | Table used in retrieving TTNs from trouble report input system 102, used to complete:<br>MCDM - management command<br>EDJI - expanded display job information<br>Arg DPI - dispatched in<br>Super Center - large area (e.g., a state)<br>RTE 450, 550 - route codes for central office<br>Bypass threshold amount 25 - unit<br>By Commitment select all less than 48 hrs<br>Select max per super center 10 |
| Times (tmt file) | File to store event times, such as, time TTN picked up, time trouble report resolution system 104 ticket added, time trouble report resolution system 104 ticket cleared, and time trouble report input system 102 ticket closed/referred |
| Trouble Ticket Details | Frf file used to store all trouble ticket information from trouble report input system 102 and trouble report resolution system 104; trouble details; |

TABLE 2-continued

Data Stores According to a Preferred Embodiment of the Present Invention

|  |  |
|---|---|
|  | trouble report resolution system 104 center location, work code and close out/refer information from trouble report resolution system 104: <br> Trouble ticket number <br> Trouble report resolution system 104 ticket number <br> Tracking key <br> Telephone number - telephone number reporting trouble <br> Commitment - time by which subscriber promised to have trouble resolved <br> Reach number - number where subscriber can be reached <br> Contact name - name of subscriber <br> Class of service - type of service being provided to subscriber, e.g., business or residential <br> Area Code (NPA) <br> Wire Center (WC) - central office where subscriber is located <br> Location - location of wire center <br> Last date cleared - last instance where customer reported problem with telephone service <br> Trouble reported - problem with telephone service reported by subscriber <br> Cable & pair - identification of tip and ring cable pair that physically connects to subscriber location <br> Office Equipment - office equipment for the switch that the technician works off of to get dial tone <br> Test (ver code & summary) - describes diagnostics performed and results of those diagnostics <br> Narrative - any other detail included to describe resolution of the trouble report <br> Trouble report resolution system 104 center location <br> Trouble report resolution system 104 work code <br> Trouble report resolution system 104 performed code <br> Work performed code <br> Trouble report resolution system 104 ticket number <br> Trouble found - description of actual problem discovered, if any <br> Action taken - any action taken to resolve the actual problem found, if any <br> Customer Advised/not - flag set to indicate whether or not the subscriber has been notified of any resolution to the trouble report <br> Cleared date & time - date and time that the trouble was resolved and cleared from trouble report resolution system 104 <br> Cleared by - identification of person clearing trouble report <br> Disposition - how trouble report was ultimately resolved <br> Cause - cause of the problem, if any <br> Work group routed to - identification of alternate department to resolve trouble report when trouble report referred to another group for resolution <br> Route code - IP address of department to which trouble report routed to <br> Narrative of why routed to work group <br> Times; TTN picked up, trouble report resolution system 104 ticket added, Trouble report resolution system 104 ticket cleared, trouble report input system 102 closed or referred |
| Work Type (referred to as Table "C") | Table used to obtain proper work type for Trouble report resolution system 104 ticket, list of Trouble report resolution system 104 work type by class of service. |

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method for processing trouble reports based on information reported to a telephone company by a subscriber, comprising the steps of:
   (a) obtaining one or more input trouble tickets stored on a trouble report input system;
   (b) building a resolution trouble ticket for each of the one or more input trouble tickets in a format that said trouble report resolution system can process using information obtained from the one or more input trouble tickets and storing each of the one or more resolution trouble tickets so built on said trouble report resolution system;
   (c) determining which resolution trouble tickets stored on said trouble report resolution system have been processed, said determining step (c) comprising the steps of;
      (c.1) storing an input trouble ticket number list containing input trouble ticket numbers corresponding to input trouble tickets that have been sent to said trouble report resolution system for processing resolution on said trouble report input system;
      (c.2) storing a pending resolution trouble ticket number list containing resolution trouble ticket numbers corresponding to resolution trouble tickets pending resolution on said trouble report resolution system; and
      (c.3) storing a list of resolution ticket numbers corresponding to resolution tickets having numbers appearing on said list of input trouble ticket numbers that do not appear on said list of resolution ticket numbers; and
   (d) closing out input trouble tickets corresponding to resolution trouble tickets determined to have been processed.

2. The method recited in claim 1, further comprising the step of closing input trouble tickets having input trouble ticket numbers corresponding to resolution trouble ticket numbers appearing on the list of resolution trouble ticket number stored in step c.3.

3. The method recited in claim 1, wherein step (a) comprises the step of using a terminal emulator to access said trouble report input system to obtain said one or more trouble input tickets.

4. The method recited in claim 3, further comprising the step of completing a mask to form a query to obtain the one or more input trouble tickets from said trouble report input system.

5. The method recited in claim 1, wherein step (b) comprises the steps of:
   (b.1) accessing said trouble report resolution system using a terminal emulator;
   (b.2) completing a mask containing fields corresponding to the information in the one or more input trouble tickets stored on the trouble report input system; and
   (b.3) building a resolution trouble ticket for each of the one or more input trouble tickets for said trouble report resolution system to process in accordance with said mask.

6. The method recited in claim 1, further comprising the step of setting a flag on said trouble report input system that indicates that an input trouble ticket has been forwarded to said trouble report resolution system for processing for each input trouble ticket forwarded to the trouble report resolution system.

7. The method recited in claim 6, further comprising the step of resetting said flag for each input trouble ticket closed out.

8. A system for processing trouble reports provided to a telephone company by subscribers of the telephone company, comprising:
   a trouble report input system into which information corresponding to a trouble reported by a telephone subscriber is stored;
   a trouble report resolution system which is accessed to determine what troubles need to be resolved;
   an interface which communicates with said trouble report input system to access said information and provide a resolution trouble ticket to said trouble report resolution system in a format that said trouble report resolution system can process;
   a process to determine which resolution trouble tickets have been processed by said trouble report resolution system and to store resolution trouble ticket numbers corresponding to those resolution trouble tickets that have been processed in a completed resolution trouble ticket number list;
   a process to receive the completed resolution trouble ticket number list and close out each input trouble ticket having a trouble ticket number corresponding to a trouble ticket number on the completed resolution trouble ticket number list;
   a list of pending resolution trouble ticket numbers stored on said trouble report resolution system; and
   wherein said process to determine which resolution trouble tickets have been processed by said trouble report resolution system comprises a process to:
      (i) compare the list of input trouble ticket numbers with the list of pending resolution trouble ticket numbers; and
      (ii) store as said completed resolution trouble ticket number list those pending resolution trouble ticket numbers having numbers corresponding to trouble ticket numbers appearing on said input trouble ticket number list, but not on said pending resolution trouble ticket number list.

9. The system recited in claim 8, further comprising a terminal emulator that accesses the information that is to be provided to said trouble report resolution system.

10. The system recited in claim 8, further comprising a terminal emulator to provide the resolution trouble ticket to said trouble report resolution system in a format the trouble resolution system can process.

11. The system recited in claim 8, further comprising a process which sets a flag corresponding to an input trouble ticket on said trouble report input system that indicates that an input trouble ticket has been forwarded to said trouble report resolution system for processing for each input trouble ticket that has been forwarded to trouble report resolution system.

12. The system recited in claim 11, further comprising a process to reset each flag for each input trouble ticket that is closed out.

13. An interface for providing communication between a trouble report input system and a trouble report resolution system, comprising:

(a) a process for obtaining one or more input trouble tickets from said trouble report input system corresponding to information submitted to said trouble report input system;

(b) a process for creating a resolution trouble ticket corresponding to each of said one or more input trouble tickets in a format that said trouble report resolution system can process;

(c) a process for determining which, if any, resolution trouble tickets have been processed;

(d) a process for closing out input trouble tickets corresponding to resolution trouble tickets for which a trouble has been resolved;

wherein said process for determining which, if any, resolution trouble tickets have been processed:

(i) compares a list of input trouble ticket numbers that have been sent to said trouble report resolution system with a list of pending resolution trouble ticket numbers stored on said trouble report resolution system; and (ii) stores a list of those pending resolution trouble ticket numbers having numbers corresponding to trouble ticket numbers appearing on said list of input trouble ticket numbers, but not on said list of pending resolution trouble ticket numbers on said trouble report resolution system.

14. The interface recited in claim 13, wherein said process for obtaining one or more input trouble tickets obtains said one or more input trouble tickets using a terminal emulator.

15. The interface recited in claim 13, wherein said process for creating resolution trouble tickets in a format said trouble report resolution system can understand creates the resolution trouble tickets using a terminal emulator.

16. The interface recited in claim 13, further comprising a process that sets a flag corresponding to an input trouble ticket on said trouble report input system that indicates that an input trouble ticket has been forwarded to said trouble report resolution system for processing for each input trouble ticket that has been forwarded to trouble report resolution system.

17. The interface recited in claim 16, further comprising a process to reset each flag for each input trouble ticket that is closed out.

* * * * *